(12) United States Patent
Maldonado et al.

(10) Patent No.: US 7,713,345 B2
(45) Date of Patent: May 11, 2010

(54) POLYPHOSPHATE MODIFIER FOR WARM ASPHALT APPLICATIONS

(75) Inventors: Rene Maldonado, Brentwood, MO (US); Michael Falkiewicz, Churchville, PA (US)

(73) Assignee: ICL Performance Products, LP, St. Louis, MO (US)

( * ) Notice: Subject to any disclaimer, the term of this patent is extended or adjusted under 35 U.S.C. 154(b) by 0 days.

(21) Appl. No.: 12/367,127

(22) Filed: Feb. 6, 2009

(65) Prior Publication Data

US 2009/0194002 A1 Aug. 6, 2009

Related U.S. Application Data

(60) Provisional application No. 61/026,649, filed on Feb. 6, 2008.

(51) Int. Cl.
*C08L 95/00* (2006.01)
(52) U.S. Cl. .................... 106/284.1; 106/281.1
(58) Field of Classification Search .............. 106/284.1, 106/281.1, 273.1
See application file for complete search history.

(56) References Cited

U.S. PATENT DOCUMENTS

| 3,177,164 | A | | 4/1965 | Mills et al. | |
|---|---|---|---|---|---|
| 4,804,696 | A | * | 2/1989 | Jolitz et al. ................... | 524/68 |
| 5,135,813 | A | | 8/1992 | Ingle | |
| 5,462,588 | A | * | 10/1995 | Walters et al. ............ | 106/284.1 |
| 5,820,663 | A | * | 10/1998 | Miller et al. ............. | 106/284.1 |
| 5,944,885 | A | | 8/1999 | Yoshinaka et al. | |
| 6,024,788 | A | * | 2/2000 | Tomioka et al. .......... | 106/281.1 |
| 6,846,354 | B2 | | 1/2005 | Larsen et al. | |
| 7,309,390 | B2 | * | 12/2007 | Falkiewicz ................ | 106/284.1 |
| 2005/0076810 | A1 | | 4/2005 | Barthel et al. | |
| 2005/0284333 | A1 | | 12/2005 | Falkiewicz | |

FOREIGN PATENT DOCUMENTS

WO 9522661 8/1995
WO 2009100356 A1 8/2009

OTHER PUBLICATIONS

International Search Report and Written Opinion for PCT/US2009/033426 dated Mar. 25, 2009.
Petersen et al., "Lime Treatment of Asphalt to Reduce Age Hardening and Improve Flow Properties", Proceedings AAPT, 1987, pp. 632-653, vol. 56.
http://www.lime.org/publications.html, "How to Add Hydrated Lime to Asphalt, An Overview of Current Methods", National Lime Association, dated Sep. 2003, Cover Page and pp. 1-14.

* cited by examiner

*Primary Examiner*—Helene Klemanski
(74) *Attorney, Agent, or Firm*—Thompson Coburn LLP; Kevin M. Kercher, Esq.

(57) ABSTRACT

The present invention is directed to an "warm" asphalt paving composition that contains a modified asphalt binder and aggregate, wherein the asphalt binder is modified, at least in part, by the addition of a hydrated phosphate modifier to the asphalt.

25 Claims, 9 Drawing Sheets

Phase 1 – 12.5 mm Superpave – Coarse Grade

Phase 1 – 12.5 mm Superpave – Coarse Grade

APA test Results
(64°C Test Temp.; 100 psi Hose Pressure; 100 lb Load)

Number of Loading Cycles

POLYPHOSPHATE MODIFIER FOR WARM ASPHALT APPLICATIONS

BACKGROUND OF THE INVENTION

1. Field of the Invention

The present invention relates to asphalt paving compositions comprising a hydrated phosphate modifier, and more particularly to the inclusion of a hydrated phosphate modifier because it tends to decrease the temperature typically necessary for mixing and forming or compressing asphalt concrete to attain certain specifications and characteristics.

2. Description of the Related Technology

As is well known, asphalt is commonly used as a paving material. Typically, the asphalt, often referred to as "asphalt cement" or "asphalt binder," is mixed with an aggregate to form an asphalt concrete suitable for paving. Thus, asphalt concrete is usually described as comprising aggregate held within a continuous phase of asphalt binder by adherence of the asphalt binder to the aggregate. Conventional methods of producing and paving with asphalt concrete typically require mixing the asphalt binder and aggregate at a temperature of at least 300° F. (about 150° C.) and paving at temperatures between about 265 and 320° F. (about 130 and 160° C.). Asphalt paving compositions made by such methods are often referred to as "hot mix asphalt" or "HMA" as used herein. In terms of handling, hot mix asphalt is able to be paved to the technical specifications and mechanical properties required by many governmental agencies. Unfortunately, however, the high temperatures typically used during production and paving of hot mix asphalt creates potential problems involving environmental, economic, and health concerns. For example, heating the components to typical hot mix temperatures requires a large amount of energy usually from burning of fossil fuels, which tends to be costly, generates emissions, including $CO_2$ and noxious gases, and releases offensive odors.

Asphalt paving compositions may also be produced at temperatures lower than those used for hot mix asphalt (see, e.g., WO95/22661), and are often referred to as "cold mix asphalt." This type of asphalt concrete, may be made by first preparing the asphalt binder as an emulsion, in which the liquid asphalt is suspended in water, or as a foam The asphalt binder emulsion or foam is then mixed with a cold and moist aggregate ("moist" is a relative term, it is aggregate that has not been heated to dry off moisture as in the hot mix process). Cold mix asphalt may be desirable for use where conventional asphalt would be difficult to produce, e.g., in remote locations or low ambient temperature environments. However, because of the methods used to make cold mix asphalt, it typically does not have the same characteristics as conventional hot mix asphalt. Cold mix asphalt tends to be permeable to water and air, which can make it more susceptible to a loss of road surface than hot mix asphalt. Cold mix asphalt also tends to have less cohesion than hot mix asphalt, which tends to result in less internal stability. Without being held to a particular theory, it is believed that cold mix asphalt suffers from these problems for several reasons related to the low temperatures employed in its production, including poor mixing of the binder and the aggregate, the presence of water in the asphalt concrete, and difficulty in spreading and compacting the asphalt concrete. Moreover, cold mix asphalt tends to require a longer cure time than hot mix asphalt, which is usually ready for use after the pavement has cooled. Despite the benefits from using lower temperatures, the use of cold mix asphalt has been limited because it typically cannot be used to produce a compacted asphalt concrete with technical specifications and mechanical properties substantially equivalent to that of a compacted hot mix asphalt.

Additionally, asphalt concrete may be produced at reduced temperatures between about 250 and about 275° F. (about 121 and about 135° C.), slightly lower than those used for making hot mix asphalt. Asphalt concrete made by such methods is often referred to as "warm mix asphalt" or "WMA" as used herein. Because warm mix asphalt is produced using lower temperatures than hot mix asphalt, it has the potential to be a lower-cost, lower-impact alternative to hot mix asphalt. That said, making warm mix asphalt typically requires some process modification(s) from that used to make hot mix asphalt so that the warm mix asphalt, when compressed, can have physical properties similar to that of compressed hot mix asphalt. For example, because of the reduced temperatures the asphalt binder tends to be more viscous, which can make it more difficult to mix, spread, and compact. To counter the increased viscosity typically associated with warm mix asphalt, a non-polymeric additive often referred to as a "warm mix modifier" or "warm mix additive" is typically added either directly to the asphalt mixture or to the asphalt binder before creating the asphalt mixture. Warm mix asphalt compositions typically do not require any other formula changes relative to hot mix asphalts and tend to have comparable resiliencies. Advantageously, it has been observed that for a variety of asphalt binders warm mixed asphalts tend to have increased densification/compaction across the ranges of usual temperatures and aggregate sizes.

Warm mix asphalt may offer several advantages for construction in the field. Because methods of making warm mix asphalt employ lower temperatures than conventional hot mix asphalt, it is safer to handle. Lower temperatures for warm mix asphalt may also allow a longer time period between picking up asphalt from a plant and laying the asphalt. Thus, hauling loads of asphalt over longer distances may be possible without a critical loss in temperature. When paving in cool ambient temperatures, warm mix asphalt tends to be easier to compact than hot mix asphalt because it tends to remain workable at lower temperatures and typically provides a longer window of time for compaction. As a result, warm mix asphalt is particularly suitable for paving in cool climates and can extend the paving season into the fall or winter in regions with moderate climates. This feature may be advantageous on large paving projects or projects with fall deadlines. Additionally, warm asphalt mixes may allow faster construction of pavements made up of deep lifts of asphalt because the temperature of warm asphalt mix is lower and less time is required to cool the mix between placing lifts. This is particularly advantageous for paving intersections, which generally need to be opened as soon as possible. Warm mix asphalt may be used for all lifts, usually about 0.75- to about 3-inches thick.

Warm mix technology is also compatible with common mix designs on the market, including Superpave and Marshall designs, as well as with production equipment and laydown equipment. Warm mix additives are also compatible with a wide ranges of aggregates and binders, including polymer-modified binders and binders comprising recycled asphalt. Additionally, in situations in which a stiff asphalt is desired polymeric modifiers are typically added, which tend to make achieving the desired degree of compaction more difficult, using warm mixes instead of hot mixes have helped achieve desired levels of compaction.

In addition to its advantages in construction, warm mix asphalt may also provide environmental, economic, and health benefits related to its use of temperatures below those used for conventional hot mix asphalt. Using reduced temperatures requires less energy and therefore consumes less fuel, typically fossil fuels. Thus, warm mix asphalt production has the potential benefits of using fewer non-renewable resources and controlling costs for producers of asphalt. Several warm mix technologies claim to reduce fuel consumption by 30 to 55%. Additionally, emission reductions has become an increasingly important concern especially in densely populated areas that persistently exceed governmental standards. Such regions have ozone levels high enough that the Environmental Protection Agency has designated them non-attainment areas. In these areas, emissions are highly regulated, so that asphalt production may be constrained by certain regulations, e.g., making asphalt mix at night. Because warm mix asphalt has the potential to reduce plant emissions in different stages of production and by up to 30%, its production may make it easier to obtain permits that would allow producers to make asphalt mix in areas and at times they previously could not. Emissions reduced by warm mix technologies include carbon dioxide, and carbon monoxide, sulfur dioxide, and nitrous oxides. Economically, reduced emissions may also reduce costs attributed to emissions control which can account for 30 to 50% of a producer's overhead costs. In addition to emissions, conventional asphalt heated to high temperatures used for making it also generates noxious odors and gases which may pose health risks for construction workers in the field. Using warm mix asphalt reduces the exposure of construction workers to these occupational hazards, as well as allowing safer handling at reduced temperatures.

In view of the foregoing, numerous efforts have been made to modify warm mix asphalt to increase its use. In particular, much of the effort has been directed to reducing the viscosity of asphalt by including various non-polymer modifier additives to the asphalt concrete mix or even to the binder compositions and the aggregate. The two primary types of modifying paving asphalt involve either foaming the asphalt or adding waxes (hydrocarbon-based modifiers) to the asphalt. Foaming methods are based on the principle of adding moisture to the asphalt and vaporizing the moisture to thereby cause the asphalt to foam, which tends to decrease the viscosity of the mix and improve adhesion. Waxes, on the other hand, are believed to improve the flow of the mix because of a lubricating effect.

One example of a foaming-type of technology involves the use of a zeolite, which is a hydrated silicate, as a warm mix asphalt modifier as disclosed in US 2005/0076810. Zeolites are framework silicates that have large interconnected vacant spaces and channels in their structures that allow easy absorption and release of water without damaging their structures. The percentage of water held internally by the zeolite is typically about 20% by mass and is usually released in the temperature range of 185° to 360° F. (about 185° to 182° C.). One such commercially available zeolite warm mix modifier is Aspha-Min® (Eurovia Services of Bottrop, Germany). It is a manufactured synthetic zeolite comprising sodium aluminum silicate that has been hydro thermally crystallized. Typically, Powdered Aspha-Min® is added to the asphalt mix at about 0.3% by mass of the mix at the same time as the binder. The heat associated with mixing asphalt drives water from the zeolite structure creating a volume expansion of the binder and resulting in foaming of the asphalt, which tends to increase the workability and aggregate coating to levels achieved at temperatures about 50° F. (30° C.) higher if the zeolite had not been added.

Another example of foaming-type technology involves using a two-component binder system for making warm mix asphalt as disclosed in U.S. Pat. No. 6,846,354. This technology is commercially available under the WAM-Foam® tradename by Shell International Petroleum, London, UK and Kolo-Veidekke, Oslo, Norway. In particular, using this technology the aggregate is first mixed with a soft asphalt binder at a temperature between about 230 and 250° F. (about 110° to 121° C.) and then the aggregate pre-coated with the soft binder is mixed with hard binder that is foamed by a concurrent injection of water that vaporizes. The foamed hard binder combines with the soft binder to achieve the required final composition and properties of the asphalt product. The initial coating of the aggregate with the soft binder is critical for preventing water from reaching and entering the aggregate. In fact, because moist aggregate negatively impacts adhesion of the binder thereto an adhesion improver is often used in the first mixing stage to enhance coating of the aggregate by the soft binder. The quality of the warm mix asphalt made using the WAM-Foam® technology also depends on the careful selection of the soft and hard binders.

Examples of asphalt modification waxes include Sasobit® (Sasol Wax, South Africa), which is fine crystalline, long chain aliphatic hydrocarbon produced from coal gasification using the Fischer-Tropsch (FT) process, and Asphaltan B® (Romonta GmbH, Amsdorf, Germany), which is a low molecular weight esterified wax based on Montan wax constituents and higher molecular weight hydrocarbons. Typically, in warm mix asphalt applications wax modifiers constitute between about 2 and 4% by weight of the mix.

Although many of the foregoing methods of reducing the temperature for making an asphalt concrete or paving composition that has mechanical properties similar to conventional hot mix asphalt have been effective to various degrees, a need continues to exist for a warm mix asphalt concrete or paving composition having mechanical properties similar to hot mix asphalt (e.g., degree of compaction and adhesion and resistance to stripping, fatigue, resistance to rutting, cracking, oxidation, etc.), in addition to other qualities that make it a desirable paving material (e.g., cost, energy requirements, environmental concerns, ease of use, etc).

BRIEF SUMMARY OF THE INVENTION

Briefly, therefore, the present invention is directed to a novel paving composition comprising an asphalt paving composition comprising an asphalt binder and aggregate, wherein the asphalt binder comprises asphalt and a hydrated phosphate modifier.

Additionally, the present invention is directed to an asphalt pavement comprising a compacted asphalt paving composition that comprises an asphalt binder and aggregate, wherein the asphalt binder comprises asphalt and a hydrated phosphate modifier.

Additionally, the present invention is directed to a modified asphalt binder comprising asphalt and a hydrated phosphate modifier.

The present invention is also directed to a method for reducing the temperature range in which an asphalt composition is subject to a particular compressive force to achieve a particular degree of compaction, the method comprising modifying the asphalt paving composition by adding a hydrated phosphate modifier.

Further, the present invention is directed to a method for preparing an asphalt paving composition, the method comprising the steps of mixing an asphalt binder, an aggregate, and a hydrated phosphate modifier to produce the asphalt paving composition.

Additionally, the present invention is directed to a method for preparing an asphalt paving composition, the method comprising the steps of mixing an asphalt binder with the aggregate to form an asphalt-aggregate mixture and the hydrated phosphate modifier is mixed with the asphalt-aggregate mixture to modify the asphalt binder to produce the asphalt paving composition.

Additionally, the present invention is directed to a method for preparing an asphalt paving composition, the method comprising mixing a modified aggregate that comprises aggregate and hydrated phosphate modifier with asphalt binder to produce the asphalt paving composition.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings:

FIGS. 2-5 show statistical curves when average compaction temperature is graphed as a function of compacted air void content.

FIG. 6 shows the amount of rutting (mm) as a function of loading cycles.

FIG. 7 is a comparison of average rut depths of various warm mix asphalt modifiers to non-modified asphalt.

DETAILED DESCRIPTION OF THE INVENTION

Figure 1:
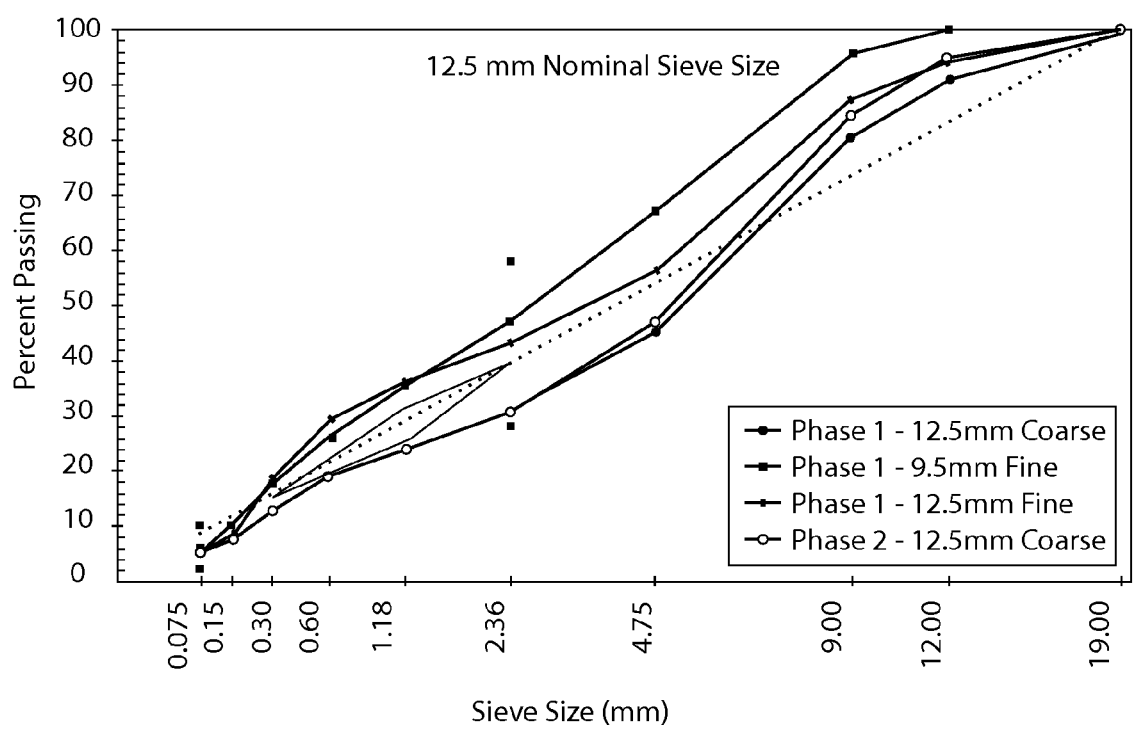
FIG. 1 illustrates a screen sieve analysis of aggregates used in testing described herein.
Figure 2:
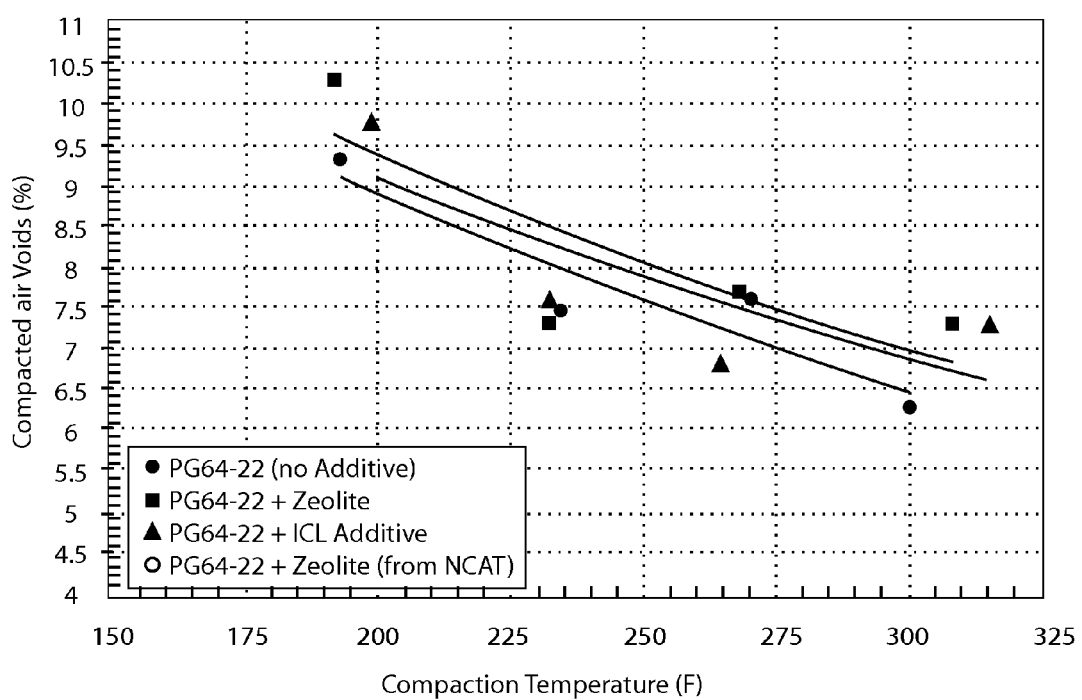
FIGS. 2-5 illustrate the degree of compaction achieved by asphalt mixes with and without different warm mix additives and using the specified aggregate gradation in a Marshall Compaction test. In particular.

In accordance with the present invention, it has been discovered that the addition of a hydrated phosphate modifier in an asphalt paving composition allows for a decrease in the temperature used to mix and pave (compact) asphalt concrete. Advantageously, it has been observed that use of the hydrated phosphate modifier of the present invention has allowed for a decrease in mixing and compaction temperatures to levels typically associated with warm mix asphalt while minimizing the negative effects typically associated with decreasing such temperatures. Thus, in one embodiment, the present invention is directed to an asphalt paving composition that comprises an asphalt, aggregate, and a hydrated phosphate modifier. Typically, the asphalt paving composition of the present invention may be formed by mixing an asphalt binder and an aggregate mixture, wherein the aggregate is treated with a hydrated phosphate modifier before mixing. It is possible, however, to add the hydrated phosphate modifier to the paving composition after the mixing of the aggregate and asphalt binder have begun (e.g., by injecting hydrated phosphate modifier into a drum mixer just after the asphalt binder is injected).

A. Asphalt

Asphalt is defined by the ASTM as a dark brown to black cementitious material in which the predominant constituents are bitumens that occur in nature or are obtained in petroleum processing. Asphalts characteristically contain very high molecular weight hydrocarbons called asphaltenes. These are essentially soluble in carbon disulfide, and aromatic and chlorinated hydrocarbons. Bitumen is a generic term defined by the ASTM as a class of black or dark-colored cementitious substances, natural or manufactured, composed principally of high molecular weight hydrocarbons, of which asphalts, tars, pitches and asphaltenes are typical. The ASTM further classifies asphalts or bituminous materials as solids, semi-solids, or liquids using a penetration test for consistency or viscosity. In this classification, solid materials are those having a penetration of not more than 1 millimeter when a load of 100 grams is applied for 5 seconds while at 25° C. and semi-solids are those having a penetration of more than 1 millimeter when a load of 50 grams is applied for 5 seconds while at 25° C. Semi-solid and liquid asphalts predominate in commercial practice today.

Asphalt has viscous properties, which allow it to flow, and elastic properties, which resist flow. At elevated temperatures, the viscous properties dominate and the asphalt tends to flow or deform. At lower temperatures, the elastic properties dominate and the asphalt tends to resist flow. All types of asphalt, both naturally occurring and synthetically manufactured, are suitable for use in this invention. Naturally occurring asphalt is inclusive of native rock asphalt, lake asphalt, etc. Synthetically manufacture asphalt is often a by-product of petroleum refining operations and includes air-blown asphalt, blended asphalt, cracked or residual asphalt, petroleum asphalt, propane asphalt, straight-run asphalt, thermal asphalt, etc. Examples of asphalt, which are often referred to by their extraction location, include Wyoming Sour, Saudi Heavy, West Texas intermediate, California Valley, Venezuelan, and Canadian.

Asphalt chemistry can be described on the molecular level as well as on the intermolecular (microstructural) level. On the molecular level, asphalt is a mixture of complex organic molecules that range in molecular weight from several hundred to several thousand. Although these molecules affect behavioral characteristics of the asphalt, the behavior of asphalt is largely determined by the microstructure of the asphalt, which is that of a dispersed polar fluid. Specifically, a continuous three-dimensional association of polar molecules (asphaltenes) dispersed in a fluid of non-polar or relatively low-polarity molecules (maltenes). All these molecules are capable of forming dipolar intermolecular bonds of varying strength. Since these intermolecular bonds are weaker than the bonds that hold the basic organic hydrocarbon constituents of asphalt together, they will break first and control the behavioral characteristics of asphalt. Therefore, asphalt's physical characteristics are a direct result of the forming, breaking, and reforming of these intermolecular bonds or other properties associated with molecular superstructures. The result is a material that behaves elastically through the effects of the polar molecule networks and viscously because the various parts of the polar molecule network can move relative to one another due to the dispersion in the fluid non-polar molecules.

Asphalt binders are most commonly characterized by the physical properties that indicate how they perform as a constituent in a paving composition or hot mixed asphalt. Examples of relevant physical properties include durability and rheology, and some tests for evaluating different aspects of these properties include: thin-film oven test (AASHTO 179 and ASTM D 1754), rolling thin-film oven test (AASHTO T 240 and ASTM D 2872), pressure aging vessel test (AASHTO PP1), penetration test (AASHTO T 49 and ASTM D 4), softening point test (AASHTO T 53 and ASTM D 36), absolute viscosity at 60° C. test (AASHTO T 202 and ASTM D 2171), kinematic viscosity at 135° C. test (AASHTO T 201 and ASTM D 2170), ductility test (AASHTO T 51 and ASTM D113), rotational viscometer test (AASHTO TP 48 and ASTM D 4402), dynamic shear rheometer (AASHTO TP 5), bending beam rheometer (AASHTO TP1), and the direct tension test (AASHTO TP 3).

Rather than refer to an extensive list of physical properties, those in the art typically categorize asphalt binders by one or more grading systems such as the penetration grading system, the viscosity grading system, and the Superpave performance grading system. Penetration grades are listed as a range of penetration units determined according to AASHTO M 20 and ASTM D 946. The 40-50 grade is the hardest grade, the 60-70, 85-100, and 120-150 grades are typically used in the U.S., and the 200-300 grade is the softest grade and is typically used for cold climates such as northern Canada. Viscosity grading is performed on as-supplied asphalt binder (AC grading) or on aged residue samples (AR grading) according to AASHTO M 226 and ASTM D 3381. Typical grades for hot mixed asphalt in the U.S. are AC-10, AC-20, AC-30, AR-4000, and AR 8000. The more recently developed Superpave performance grade (PG) is generally considered to more accurately and fully characterize asphalt binders for use in hot mixed asphalt pavements. Superpave performance grading is based on the idea that an asphalt binder's properties should be related to the conditions under which it is used. Therefore, the Superpave system uses several tests that are performed according to AASHTO PP6 at temperatures that depend on the relevant climate conditions. The Superpave performance grading is reported using two numbers—the first being the average seven-day maximum pavement temperature (° C.) and the second being the minimum pavement design temperature (° C.) to be experienced. Thus, a PG 58-22 is intended for use where the average seven-day maximum pavement temperature is 58° C. and the expected minimum pavement temperature is −22° C. Asphalt binders that are typically used in the U.S. have an average seven-day maximum pavement temperature that is within the range of about 50 and about 80° C. and an expected minimum pavement temperature that is within the range of about −10 and about −40° C. It is to be noted that as a general rule, PG binders that differ in the high and low temperature specification by 90° C. or more are typically the result of some sort of modification, which may include addition of polymers and/or polyphosphoric acid, in order to improve certain characteristics such as resistance to high temperature thermal deformation ("creep" or "rutting"), low temperature cracking, or both.

As mentioned above, the paving composition of the present invention is not limited to any particular asphalt binder or combination of binders. Although any asphalt binder may be used, it is preferred that the paving composition comprises an asphalt binder or combination of binders having physical properties suitable for the particular application. The selection of such an asphalt binder or combination of binders is well known to those of skill in the art. Examples of commercially available asphalt binders that may be suitable for preparing a paving composition of the present invention include CONOCO AC-30, DIAMOND SHAMROCK AC-30, SHELL AR-4000, AMOCO 64-22, CITGO AC-30, CITGO PG 67-22, VALERO PG 64-22, and HUSKY 85/100.

B. Hydrated Phosphate Modifier

A hydrated phosphate modifier may be used as a warm mix modifier (i.e., a compound added to, for example, asphalt binder, aggregate, and/or mixed asphalt concrete, to, among other things, decrease the temperature necessary to achieve adequate mixing, adhesion, compaction, etc.). A hydrated phosphate modifier is any phosphate that forms relatively stable hydrates. More specifically, for a relatively stable hydrated phosphate modifier, its water of hydration will release, if at all, at relatively low rate(s) at relatively low temperatures (e.g., below about 50° C.) but will release its water of hydration relatively rapidly at moderately elevated temperatures (e.g., temperatures above about 50° C.). The relatively rapid release of the water vapor is believed to the reason for the foaming of the asphalt binder, which tends to lower the viscosity and allow for adequate processing (e.g., mixing, transport, compaction, etc.) at reduced temperatures. Without being held to a particular theory, it is also believed that such a modified asphalt concrete may be adequately compacted using conventional means at temperatures below that typically associated with hot mix asphalt because a thin film of foamed asphalt is formed at the interface of the binder and the aggregate. Additionally, it is possible that residual phosphorus of phosphorous-containing compounds may enhance certain properties such as elastic modulus and high temperature grading by interacting with components in the asphalt binder.

Among other things, the hydrated phosphate modifier of the present invention preferably disperses readily in the asphalt binder, and/or asphalt mix so that the water is released relatively uniform throughout the volume of binder. Another property of hydrated phosphate modifiers that is believed to be desirable is their phosphorus content because of its ability to modify asphalt binders. Examples of suitable hydrated phosphate modifiers include but are not limited to dimagnesium phosphate trihydrate, disodium phosphate dihydrate, trisodium phosphate crystalline, monocalcium phosphate monohydrate, tetrasodium pyrophosphate dodecahydrate, dicalcium phosphate dihydrate, and combinations thereof. Hydrated phosphate modifiers containing cations other than sodium, calcium, and magnesium (e.g., potassium) are also expected to be effective.

Regardless of the hydrated phosphate modifier or combination of hydrated phosphate modifiers that are selected, the amount of hydrated phosphate modifier added to the paving composition is an effective amount, that is to say, the amount that allows a decrease the processing temperatures to a desire level preferably without negatively impacting the performance of pavement formed therewith. That said, in certain circumstances, it may be desirable to sacrifice one or more performance characteristics in exchange for the lower temperature processing benefit (e.g., mixing, handling, and compaction). Generally, it is preferred to add an amount of hydrated phosphate modifier that achieves the maximum reduction in processing temperatures while maintaining at least the minimum performance characteristics for a particular application. Although this optimum amount depends on several factors including the type of asphalt (i.e., the chemical composition of the asphalt), the type of aggregate used to make the paving composition, the moisture content of the asphalt and the aggregate, the inclusion of polymer additives, etc.), it may be readily determined through routine empirical testing. In general, however, it is believed that the lower processing temperatures may be observed by including as little hydrated phosphate modifier such that the associated water of hydration is about 0.01% by weight of the asphalt binder. At the other end of concentration spectrum, experimental results to date indicate that the desirable asphalt pavement properties tend to fall below generally acceptable levels if the concentration of hydrated phosphate modifier is such that the associated water of hydration is greater than about 6.0%. Experimental results to date indicate that desirable degrees of temperature reduction and physical properties of the asphalt are typically realized when the concentration of hydrated phosphate modifier is such that the associated water of hydration is at least about 0.05% and no greater than about 2.0% by weight of the asphalt binder.

In view of the foregoing, in one embodiment of the present invention the hydrated phosphate modifier is sodium tripolyphosphate hexahydrate ($Na_5P_3O_{10}.6H_2O$), which is also referred to as STPP hexahydrate. When using STPP hexahydrate, it is preferably added so that it comprises at least about 0.2% and no greater than 1.0% by weight of the asphalt paving composition. In fact, experimental results indicate that a particularly effective concentration of STPP hexahydrate is about 0.4% by weight of the asphalt paving composition.

Advantageously, it is believed that hydrated phosphate modifiers are compatible with other asphalt additives including polymer modifiers, anti-stripping agents, and chemical modifiers (e.g., polyphosphoric acid). These other additives may be present in the binder before, during, and/or after mixing with the aggregate.

C. Polyphosphoric Acid

In addition to a hydrated phosphate modifier, the paving composition of the present invention may comprise a polyphosphoric acid. A polyphosphoric acid is a series of oxyacids of phosphorous having the general chemical formula $H_{n+2}(P_nO_{3n+1})$. More specifically, polyphosphoric acids occur in the $P_2O_5$—$H_2O$ system and have a $P_2O_5$ content that is above about 74 percent. Polyphosphoric acids are complex mixtures of ortho-(n=1), pyro-(n=2), tri-(n=3), tetra (n=4), and longer chain polymer species, the proportions of which are a direct function of the $P_2O_5$ content of the acid. Although polyphosphoric acids may be referred to in terms of $P_2O_5$ content, polyphosphoric acids are typically referred to in terms of an equivalent $H_3PO_4$ (phosphoric acid) concentration or percentage. Preferably, the polyphosphoric acid used in the preparation of the asphalt paving composition of the present invention has an $H_3PO_4$ equivalent concentration of at least about 100%. More preferably, the polyphosphoric acid has an $H_3PO_4$ equivalent concentration of at least about 105%. Still more preferably, the polyphosphoric acid has an $H_3PO_4$ equivalent concentration of at least about 110%. Even more preferably, the polyphosphoric acid has an $H_3PO_4$ equivalent concentration of at least about 115%. Examples of appropriate polyphosphoric acids include acids having a $H_3PO_4$ equivalent content of 105% ($P_2O_5$ content of about 76.05%), a $H_3PO_4$ equivalent content of 115% ($P_2O_5$ content of about 83.29%), or a $H_3PO_4$ equivalent content of 116.4% ($P_2O_5$ content of about 84.31%), which are commercially available from ICL-Performance Products LP.

Polyphosphoric acids are not water-based and are less corrosive than water-based phosphoric acids, which is advantageous over water-based phosphoric acids. For example, the mixing of phosphoric acid with hot asphalt under typical blending conditions tends to result in foaming and splattering, whereas polyphosphoric acids are readily incorporated with little or no foaming and splattering.

Preferably, the amount of polyphosphoric acid added to the paving composition is an effective amount, that is to say, an amount that increases the adhesion between the asphalt binder and the aggregate compared to an identical paving composition that contains no polyphosphoric acid. More preferably, the polyphosphoric acid is added to the paving composition in an amount that achieves the maximum anti-stripping benefit. Although this optimum amount depends on several factors including the type of asphalt (i.e., the chemical composition of the asphalt), the type of aggregate used to make the paving composition, the moisture content of the asphalt and the aggregate, the inclusion of polymer additives, etc.), it may be readily determined through routine empirical testing. In general, however, it is believed that anti-stripping improvements may be observed by including as little as about 0.05% by weight of polyphosphoric acid in the asphalt binder. Preferably, the concentration of polyphosphoric acid added to the asphalt is at least about 0.1% by weight of the asphalt binder. More preferably, the concentration of polyphosphoric acid added to the asphalt is at least about 0.2% by weight of the asphalt binder.

It has also been discovered that the adhesion may be detrimentally affected by exceeding an upper concentration of polyphosphoric acid. Although this upper concentration level varies on the particular asphalt, it is preferred that the concentration of polyphosphoric acid added to the asphalt be no greater than about 2% by weight of the asphalt binder. More preferably, the concentration of polyphosphoric acid added to the asphalt is no greater than about 1.5% by weight of the asphalt binder. Still more preferably, the maximum concentration of polyphosphoric acid is about 1.2% by weight asphalt binder. Even more preferably, the maximum concentration of polyphosphoric acid is about 1% by weight of the asphalt binder. Still even more preferably, the concentration of polyphosphoric acid added to the asphalt is maximum concentration is about 0.7% by weight asphalt binder.

In view of the foregoing, in one embodiment of the present invention the polyphosphoric acid is at a concentration that is within a range of about 0.05 to about 2.0% by weight of the asphalt binder. Preferably, the polyphosphoric acid is at a concentration that is within a range of about 0.1 and about 1.2% by weight of the asphalt binder. More preferably, the polyphosphoric acid is at a concentration that is within a range of about 0.1 and about 0.7% by weight of the asphalt binder.

D. Alkaline Anti-Stripping Additive

Additionally, the paving composition of the present invention may comprise an alkaline anti-stripping additive. It is contemplated that, typically, the alkaline anti-stripping additive would be hydrated lime, which comprises calcium hydroxide ($Ca(OH)_2$). Commercial hydrated lime is a dry powder obtained by treating quicklime (calcium oxide, CaO) with sufficient water to satisfy its chemical affinity for water, thereby converting the oxides to hydroxides.

Preferably, the amount of lime added to the paving composition is an effective amount, that is to say, an amount that increases the adhesion between the asphalt binder and the aggregate compared to an identical paving composition that contains no lime. More preferably, the lime is added to the paving composition in an amount that achieves the maximum anti-stripping benefit. Although this optimum amount depends on several factors including the type of asphalt (i.e., the chemical composition of the asphalt), the type of aggregate used to make the paving composition, the moisture content of the asphalt and the aggregate, the inclusion of polymer additives, etc.), it may be readily determined through routine empirical testing. In general, it is believed that anti-stripping improvements may be observed by including as little lime as about 0.5% by weight of the aggregate in the paving composition. Preferably, the concentration of lime added to the paving composition is at least about 1% by weight of the aggregate. Additionally, it is preferred that the concentration of lime added to the paving composition is not so great as to be a detriment to other properties. Typically, the concentration of lime is no greater than about 2.0% by weight of the aggregate. Preferably, the concentration of lime is no greater than about 1.5% by weight of the aggregate. As such, in one embodiment of the present invention the paving composition comprises lime at a concentration that is between about 0.5 and about 2.0% by weight of the aggregate. Preferably, the paving composition comprises lime at a concentration that is between about 1 and about 1.5% by weight of the aggregate.

When lime is added to hot mix asphalt, it reacts with the aggregate to strengthen the bond between the bitumen and the stone. At the same time that it treats the aggregate, lime is believed to react with the asphalt binder. Specifically, it is believed that the lime reacts with highly polar molecules that can otherwise react in the mix to form water-soluble soaps that promote stripping. When those molecules react with lime, they form insoluble salts that no longer attract water (see, e.g., Petersen, J. C., H. Plancher, and P. M. Harnsberger, "Lime Treatment of Asphalt to Reduce Age Hardening and Improve Flow Properties," Proceedings, AAPT, Vol. 56, 1987). Additionally, the dispersion of the tiny hydrated lime particles throughout the mix makes it stiffer and tougher, reducing the likelihood the bond between the asphalt binder and the aggregate will be broken mechanically, even if water is not present.

The hydrated lime that is used to prepare the paving composition of the present invention may be added to the aggregate, asphalt, or both according to any appropriate method. There are several proven and effective methods for adding hydrated lime to asphalt. Examples of such methods include injecting hydrated lime into a drum mixer, adding the lime in a pug mill, adding dry hydrated lime to moist aggregate with marination, adding slurry lime to aggregate with or without marination (see, e.g., "How to Add Hydrated Lime to Asphalt," An Overview of Current Methods, National Lime Association, http://www.lime.org/publications.html). Typically, the method by which hydrated lime is added is specified by the state departments of transportation. These state-developed specifications and procedures are typically tailored to local materials and the capabilities of construction firms and equipment. That said it is generally preferred to add the hydrated lime to the aggregate.

E. Surface-Active Anti-Stripping Additives

Additionally, the paving composition of the present invention may comprise a surface-active anti-stripping additive. Most surface-active anti-stripping additives are amine-type additives. It is important to note that type of surface-active anti-stripping additive that may be included in a paving composition of the present invention is not limited to the amine-type, but also includes, other commercially available surface-active materials that are known by those of skill in the art to increase adhesion between aggregate and asphalt binder, including phosphate esters such as GRIPPER X2 (available from Kao, Corp) and INNOVALT W (available from Innophos, Inc.).

Typically, amine-type anti-stripping additives comprise, for example, primary amines, diamines, triamines, tetramines, polyamines, amido amines, or ethoxylated diamines, etc. Preferably, a surface-active anti-stripping additive is a liquid so that is more readily mixed throughout the asphalt. Exemplary commercially available liquid amine anti-stripping additives include the PAVEBOND and MORLIFE anti-strips commercially available from Rohm and Haas and the AD-HERE anti-strip available from Arr-Maz Custom Chemicals, Inc.

If included, the concentration of surface-active anti-stripping additive in the paving composition of the present invention is preferably consistent with the concentration(s) considered appropriate for the particular application and the associated variables such as type of asphalt, type of aggregate, etc. Typically, the concentration of surface-active anti-stripping additives is between about 0.5 and about 1.0% by weight of the asphalt binder.

In another embodiment, however, the paving composition of the present invention is preferably not modified with liquid anti-stripping additives, in general, and amine-type anti-strips, in particular. Stated another way, in this embodiment the asphalt binder is preferably substantially free of liquid amine anti-stripping additives. Specifically, the concentration of such additives is, in order of increasing preference, less than about 0.5, 0.2, 0.1, 0.05, or 0.01% by weight of the asphalt binder, or even 0%.

F. Polymer Asphalt Modifiers

The pavement composition of the present invention may also comprise a polymer modifier. Typical polymer asphalt modifiers include styrene-butadiene-styrene copolymers (SBS), styrene-butadiene copolymers (SB), and elastomeric terpolymers. Commercially available terpolymers include ELVALOY available from DuPont, which is an ethylene-glycidyl-acrylate polymer (i.e., it comprises an ethylene backbone modified with a glycidyl functional group to provide epoxy-like reactive properties and an acrylate functional group to provide flexibility and elastomeric properties). Additional appropriate polymer modifiers may include ethylene-vinyl-acetate (EVA) polymers, ethylene-methacrylate (EMA) polymers, styrene-isoprene copolymers (SIS), epoxy resins, natural rubbers, and polydiolefins such as polybutadiene and polyisoprene.

If included, the concentration of polymer modifier in the paving composition of the present invention is preferably consistent with the concentration(s) considered appropriate for the particular application and the associated variables such as type of asphalt, type of aggregate, etc. Typically, the concentration of polymer modifiers is between about 2 and about 10% by weight of the asphalt binder. More typically, the concentration of polymer is between about 2 and about 6% by weight of the asphalt. binder Terpolymers such as the commercially available ELVALOY modifier typically comprise about 2% by weight of the asphalt binder and sometimes as little as about 1% by weight of the asphalt binder.

In another embodiment, however, the paving composition of the present invention is preferably not modified with polymers. Stated another way, in this embodiment the asphalt binder is preferably substantially free of polymer modifiers. Specifically, the concentration of such additives is, in order of increasing preference, less than about 1.0, 0.5, 0.2, 0.1, 0.05, or 0.01% by weight of the asphalt binder, or even 0%.

In view of the foregoing embodiments, the paving composition may also be substantially free of liquid anti-strips and polymer modifiers. Thus, in one embodiment of the present invention the paving composition of present invention may consist essentially of asphalt binder, hydrated phosphate modifier, and aggregate at the concentrations that are preferable in accordance with the values set forth herein.

G. Preparation of the Asphalt Binder

The preparation of the asphalt binder may be accomplished by any appropriate means known in the art such as direct addition with agitation or in-line mixing. Regardless of the method, the asphalt binder preparation is typically facilitated by increasing the temperature of the asphalt binder, the hydrated phosphate modifier, and other additives. The hydrated modifier may be injected into the binder by any means known in the art, including using a modified fiber feeder or a pneumatic feeder made for the material. Although the hydrated phosphate modifier may be added, in whole or in part, directly to the asphalt binder, it is currently believed that it is better to add the entirety of the hydrated phosphate modifier to the aggregate.

To facilitate mixing, the temperature is increased to at least the softening point of the asphalt. When the binder is used to produce conventional hot mix asphalt, the temperature of the mixture is increased to between about 160 and about 200° C. But when using a hydrated phosphate modifier, the temperature of the mixture is preferably increased to between about 120 and about 150° C. Typically, additives are not added to an asphalt until the asphalt is heated to a temperature sufficient for effective mixing purposes. As such, the hydrated phosphate modifier and any other constituents are introduced into the hot feed of asphalt with agitation adequate to disperse the hydrated phosphate modifier and other optional constituents throughout the asphalt.

Asphalt binders that comprise asphalt, additives such as hydrated phosphate modifiers, and polymer modifiers (if present) are typically prepared by blending the constituents in-line at the hot mix plant (often referred to as post-blending). But it is possible for the hydrated phosphate modifier and polymer modifiers to be blended with asphalt by an asphalt binder supplier (i.e., before being delivered to a hot mix asphalt plant, which is often referred to as pre-blending). Warm-mix modifiers (e.g., hydrated phosphate modifiers) are typically not pre-blended. This preference, however, should not be interpreted as an indication that the hydrated phosphate modifier cannot be pre-blended with an asphalt binder (free of, or containing a polymer modifier). Some combinations of asphalt and additives may be mixed relatively easily using a mixing kettle, while others require high shear milling or other special mixing operations. Methods for mixing warm mix modifiers and asphalt are well known to those of skill in the art and any such method may be used to prepare an asphalt paving composition of the present invention.

H. Aggregate

"Aggregate" is a collective term for the mineral materials such as sand, gravel, and crushed stone that are used with an asphalt binder to form compound materials such as a asphalt paving composition. By volume, aggregate typically accounts for at least about 90% by volume of an asphalt paving composition. For example, it is not uncommon for asphalt paving compositions to comprise between about 92 and about 96% by volume of aggregate.

The aggregate may comprise natural aggregate, manufactured aggregate, or a combination of the two. Natural aggregate is typically extracted rock from an open excavation (i.e., a quarry) that is reduced to usable sizes by mechanical crushing. Natural aggregates come from rock from three broad geological classifications: igneous, sedimentary, and metamorphic. Igneous rocks are primarily crystalline that were formed by the cooling of molten material beneath the earth's crust. Sedimentary rocks were formed from deposited insoluble material on the bottom of an ocean or lake that was transformed to rock by heat and pressure. Sedimentary rocks are layered in appearance and are further classified based on the predominant mineral. For example, sedimentary rocks are generally classified as calcareous (limestone, chalk, etc.), siliceous (chert, sandstone, etc.) or argillaceous (shale, etc.). Metamorphic rocks are igneous or sedimentary rocks that have been subjected to enough heat, pressure, or both that their mineral structure has changed from that of the original rock. Manufactured aggregate is typically the byproduct of other manufacturing processes such as slag from metallurgical processing (e.g., steel, tin, and copper production). Manufactured aggregate also includes specialty materials that are produced to have a particular physical characteristic not found in natural rock such as low density. The mineral composition of the aggregate largely determines the physical and chemical characteristics of the aggregate and how it performs as a pavement material. In particular, the composition of the aggregate significantly affects the susceptibility or propensity of a pavement composition to undergo stripping. In fact, the physiochemical surface properties of the aggregate may play a much larger role in stripping of hot mixed asphalt than the properties of the asphalt binder. Although the complex phenomena related to the displacement of the asphalt binder from the surfaces of the aggregate particles by water is not yet fully understood, it is known that the aggregate's chemical composition or mineral content is a significant factor. For example, an aggregate's affinity to water or asphalt plays a role. Some aggregates have an affinity for water over asphalt (hydrophilic), which tends to make them more susceptible to stripping. These aggregates tend to be acidic and examples include quartzite, sandstone, and granite. On the other hand, aggregates with an affinity for asphalt over water (hydrophobic) tend to be less susceptible to stripping. These aggregates tend to be basic and examples include marble, limestone, basalt, and dolomite. The paving composition of the present invention may comprise any appropriate type of paving aggregate. As indicated by the examples below, however, the improvement in adhesion is particularly evident when using aggregate known to be susceptible to stripping such as Lithonia granite.

Thus, aggregate may be selected to improve the compaction of the paving composition. The selection of aggregate, however, typically is not based solely on its propensity for compaction. Other factors such as hardness, toughness, stripping resistance, abrasion resistance, fatigue resistance, cost, availability, etc., are typically considered and may be of greater importance than compaction.

An aggregate is also selected based on the maximum size or mix size of its particles. Examples of mix sizes include 4.75 mm, 9.5 mm, 12.5 mm, 19.0 mm, 25.0 mm, and 37.5 mm. In addition to mix size, gradation (i.e., the relative amounts of different sized particles, which is typically determined by sieve analysis) tends to be a selection factor. Examples of typical gradations include: dense or well-graded, which is the most widely used in the U.S.; gap graded, which tends to be prone to segregation during placement of the paving composition; open graded, which may result in a greater percentage of voids because there are not enough small particles in between larger particles; and uniformly graded in which all the particles are essentially the same size.

The selection of an appropriate aggregate type and its properties (e.g., mix size, gradation, moisture content, etc.) for a particular application is based on many factors such as pavement location, traffic type, temperature, etc. and is known and understood by those of skill in the art. When producing a warm mix asphalt comprising a hydrated phosphate modifier in accordance with the present invention and aggregate graded according to Superpave specifications, experimental results to date indicate aggregate having a Superpave gradation that is greater than 9.5 mm is preferred (e.g., a 12.5 mm Superpave gradation).

As mentioned above, it believed that it is preferable to add the hydrated phosphate modifier to the aggregate rather than to the asphalt binder directly when forming the asphalt paving mixture. The hydrated phosphate modifier may be added to the aggregate according to any appropriate method. As mentioned above, aggregate is typically heated to drive off moisture before it is added to the asphalt and the hydrated phosphate modifier may be added to the aggregate before, during, or after the moisture drive off heating operation or a combination thereof. That said, in one embodiment of the present invention the hydrated phosphate modifier is added to the aggregate during the heating operation before the aggregate is mixed with the asphalt. A mixture comprising a hydrated phosphate modifier and aggregate shall be referred to herein as a "modified aggregate." If present, it is preferable to also add an alkaline anti-stripping additive to the aggregate as it is being heated before or concurrently with the hydrated phosphate modifier. In an alternative embodiment, the heated aggregate is mixed with an asphalt binder to form an asphalt-aggregate mixture and then the hydrated phosphate modifier is added to the asphalt-aggregate mixture.

I. Method of Preparing an Asphalt Paving Composition

Because it is generally understood by those of skill in the art that the extent of enhancement or detriment to properties such as compaction, rutting, fatigue, and other properties such as anti-stripping, stiffness, abrasion resistance, oxidation and aging, and cracking depend in large part on numerous variables such as the type(s) of asphalt(s), type(s) of aggregate(s), asphalt modification parameters including the temperature, time, type(s) and concentration(s) of modifying agents, an empirical determination of the optimum materials, concentrations, processing conditions, or combinations thereof is preferred to produce an asphalt concrete having the highest degree of compaction and resistance to rutting, among other acceptable properties.

In general, an acceptable asphalt paving composition may be prepared by mixing the asphalt binder, the aggregate, and the hydrated phosphate modifier (added to the asphalt binder directly, added to the aggregate before the aggregate is mixed with the asphalt binder, added concurrently with the mixing of asphalt binder and aggregate, or a combination thereof) plus any other additives at an elevated temperature (e.g., greater than about 240° F. (120° C.) but temperature as low as about 190° F. (88° C.) have been effective) for a duration sufficient to coat the aggregate (e.g., between about 1 and about 4 hours) according any method known in the art. Before being mixed together, the asphalt binder is preferably heated to a temperature of at least about 240° F. (120° C.) (but a temperature as low as about 220° F. (105° C.) have been effective) and the aggregate modified aggregate is preferably heated to a similar temperature. One of the purposes for heating the binder is to age it and make it less susceptible to rutting. Because of this, heating the asphalt binder to a temperature of at least about 240° F. (120° C.) is generally preferred. If, however, temperatures below about 240° F. (120° C.) are desired, a stiffer binder grade may be used, in whole or in part, to decrease the potential for rutting of the paved asphalt mix. Although the asphalt mix and its constituents may be heated to temperatures typically associated with hot mix asphalt (e.g., greater than about 300° F. (150° C.)), they are preferably only heated as high as temperatures typically associated with warm mix asphalt (e.g., no greater than about 300° F. (150° C.)). It is expected that the asphalt mix and its constituents will typically be heated to temperatures within the range of about 190 to about 280° F. (about 88° C. to about 140° C.). If mixing temperatures below about 240° F. (120° C.) are desired, a stiffer binder grade may be used for warm asphalt mixes to decrease the potential for rutting of the paved asphalt mix. Lower mixing temperatures do not age the binder as much as hot mix temperatures do, and less aging on the binder may make the mix susceptible to rutting.

Common methods of mixing include batch preparation, the parallel-flow drum-mix, and the counter-flow drum mix. Although different methods may be used to combine the aggregate with the asphalt binder, the resulting paving composition is essentially the same—aggregate and binder in an amount sufficient to coat the aggregate and adequately bind the paving composition. The addition of a hydrated phosphate modifier requires little, if any, modification to the production process. It may be added using any appropriate device or method such as a modified fiber feeder or a pneumatic feeder. Typically, the amount of asphalt binder is at least about 3% by weight of the asphalt paving composition with the remainder comprising the aggregate. Additionally, the paving composition typically does not comprise more than about 8% by weight of the asphalt binder because, among other things, it becomes significantly more costly and typically more prone to deformation. In view of this, the concentration of asphalt binder in the paving composition is preferably between about 3 and about 8% by weight. More preferably, the concentration asphalt binder is between about 4.5 and about 6.5% by weight. The addition of a hydrated phosphate modifier is not expected to impact the calculations of volumetrics. Stated another way, it is believed that the optimal content of binder and aggregate may be determined without consideration of whether hydrated phosphate modifier is present. Additionally, it is believed that using a hydrated phosphate modifier may increase compaction/densification compared an identical mix except for the absence of the hydrated phosphate modifier across a wide variety of temperature and aggregate size ranges.

J. Use of an Asphalt Paving Composition

It is important to note that although the addition of hydrated phosphate modifier may be used to enhance the workability for preparing and paving asphalt at reduced temperatures, other factors related to how a paving composition is applied play a significant role in the technical specifications and mechanical properties of a pavement. For example, it is well known by those of skill in the art that the thickness of the pavement ("lift thickness") and the degree of compaction, often measured as void percentage, affect the permeability of the pavement to water. In general, it is believed that that lift thickness should be between three and about four times that of the aggregate mix size. For example, the preferred lift size for a paving composition containing a 9.5 mm mix size is about 38 mm (about 1.5 inches). Warm-mix asphalts can be used for every lift of any mix design on the market. The proper mix selection and the lift thickness aids the compaction of the paving composition thereby reducing permeability. Preferably, the compaction of the paving composition is to a void percentage that is less than about 7.5%. Typically, the compaction may be such that a void percentage as low as about 4-5% may be attained. Any method of compaction that is known in the art may be used to compact the asphalt mix comprising the hydrated phosphate modifier. The preferred compaction method in the field is by rollers. Compaction is generally maintained until a certain density is reached. The standard Marshall compaction technique, (ASTM 2435), may also be used, especially for laboratory testing.

EXAMPLES

The following examples illustrate the asphalt paving composition that contains asphalt, aggregate, polyphosphoric acid, and a hydrated phosphate modifier, as well as methods of producing and paving such a composition. The examples demonstrate certain methods and are not intended to limit the scope of the present invention. Those of skill in the art should, in light of the present disclosure, appreciate that many changes can be made in the specific embodiments which are disclosed and still obtain a like or similar result without departing from the spirit and scope of the invention.

Example 1

Evaluation of Water Content Using Thermogravimetric Analysis (TGA)

Thermogravimetric Analysis (TGA) is a simple thermal analysis technique to determine water content in a sample. TGA consists of measuring the weight change of material of known amount, as a function of temperature in a controlled atmosphere. TGA was performed on samples of sodium tripolyphosphate hexahydrate (STPP hexahydrate; $Na_5P_3O_{10}.6H_2O$), trisodium phosphate crystals ($Na_3PO_4.12H_2O.\frac{1}{4}NaOH$), and Zeolite (Aspha-Min ZC3; $Na_2O.Al_2O_3.2SiO_2.4,5H_2O$), a known warm mix asphalt modifier additive. The samples were heated from 25 to 350° C. at 5° C. per minute under nitrogen purge. Table A shows the results of the TGA.

TABLE A

| Sample | Percent Weight Loss (25-350° C.) Average |
|---|---|
| Sodium Aluminum Silicate (Zeolite Aspha-Min ZC3) | 18.4% |
| Sodium Tripolyphosphate Hexahydrate (STPP-593 Granular Tech Grade) | 18.2% |
| Trisodium phosphate crystalline | 50.5% |

The foregoing data indicates that STPP Hexahydrate and Zeolite have similar water content as a percentage of the mass of the material. Additionally, the graphs from the thermogravimetric analysis were analyzed for the rates at which the water was released from the STPP Hexahydrate and Zeolite. Overall, the two released water at rates that are fairly similar but the Zeolite tended to released its water at a more constant rate than the STPP Hexahydrate. More specifically, the Zeolite release profile comprises two general regions: (1) a relatively constant, high rate from about 50° C. to about 150° C. and (2) then the water loss rate decreased but was relatively constant from about 150° C. to about 350° C. In contrast, the STPP Hexahydrate water exhibited a profile with four general regions: (1) a somewhat greater rate of water loss between about 75° C. and about 100° C. than the Zeolite but relatively constant; (2) a still greater rate between about 100° C. and 140° C.; (3) the rate significantly decreased about 140° C. and remained relatively constant to about 220° C.; and (4) then a gradually decreasing rate between about 220° C. and 330° C. Trisodium phosphate crystalline showed a weight loss of about 48% between 30° C. and 112° C. It is believed that the initial rapid release of water from warm mix asphalt modifier additives causes the binder to foam. It is believed that the slow release of water above 150° C. from warm mix asphalt modifier additives results in a microscopic foaming effect. Thus, the amount of water that is released and the release profile of STPP hexahydrate makes it useful as a warm asphalt modifier additive.

Example 2

Compaction Properties of Asphalt Comprising Modifier Additives

To determine how reductions in production temperature and the addition of modifier additives relate to the ability to compact asphalt paving compositions, a Marshall Compaction device was used to evaluate the effects of the addition of different warm mix additives on workability and compaction. It is important to know the degree of compaction as most state agencies specify a density or air void level for construction projects, and density is usually a paid specification in construction paving contracts.

For these studies different Superpave aggregates were used because they are the most prevalent aggregate mixes used in the United States. The aggregate source was a granite/gneiss aggregate, which is also common and is used in approximately 50% of all conventional asphalt construction conducted in New Jersey. FIG. 1 is a graph showing a screen sieve analysis of the foregoing aggregates. As depicted therein the different aggregates, from finest to coarsest were as follows: a 9.5 mm-Superpave-Fine Grade mix, a 12.5 mm-Superpave-Fine Grade mix, a first (phase 1) 12.5 mm-Superpave-Coarse Grade mix, and a second (phase 2) 12. mm-Superpave-Coarse Grade mix. The asphalt binder used to make the samples was PG64-22 (CITGO Asphalt, Paulsboro, N.J.). Samples were prepared of asphalt mixes comprising either no additive, Sasobit, Aspha-Min, or sodium tripolyphosphate hexahydrate. Sasobit (Sasol Wax), was added at a percentage of 3% by the total weight of the asphalt concrete mix. Aspha-Min (Eurovia), was added at a percentage of 0.3% by the total weight of the asphalt concrete mix. Sodium polyphosphate hydrate (ICL Performance Products LP) was added at a percentage of 0.4% by total weight of the asphalt concrete mix. Sasobit, zeolite, and sodium tripolyphosphate hexahydrate were added and mixed according to the manufacturer's recommendations. Specifically, the additives Aspha-Min and sodium tripolyphosphate hexahydrate were added to the aggregate just prior to the addition of the asphalt binder to simulate the typical application area at a hot mix facility (either through the RAP collar system or pneumatically fed using a specially built feeder system—similar to the addition of fibers).

A Marshall compactor was used to compact 4-inch diameter samples, 3 samples per each mixture to provide an average density and air void value (FIGS. 2-5). The Marshall compactor was used at a level of 75 blows, which is typically used for the design of hot mix asphalt for heavy traffic volume conditions. The advantage of using the Marshall compactor is that it requires a smaller amount of material than other compaction procedures. It also has a standardized acceptance as a means of compaction for HMA mixture design and can most likely be found in a number of HMA laboratories.

To provide a direct comparison with other research found in the literature, four target test temperatures were selected; 300, 265, 230, and 195° F. (~150° C., ~130° C., ~110° C., ~90° C., respectively). The mixture temperatures were measured and recorded during mixing, immediately after mixing, immediately before compaction, and immediately after compaction to provide an accurate means of evaluating the temperature/compaction properties of the different mixes. The actual temperatures used for compacting the samples were 203° F., 232° F., 261° F., 296° F. (~95° C., ~111° C., ~127° C., ~147° C., respectively).

Once the samples had cooled after compaction, the resultant air void contents were measured and recorded. The bulk density of each specimen was measured using (AASHTO Ti 66) "Bulk Specific Gravity of Compacted Bituminous Mixtures Using Saturated Surface-Dry Specimens." Loose mix of each mixture was also tested for its respective maximum specific gravity using AASHTO T209 "Maximum Specific Gravity of Bituminous Mixtures" to calculate the compacted air voids of each sample.

Figure 3:
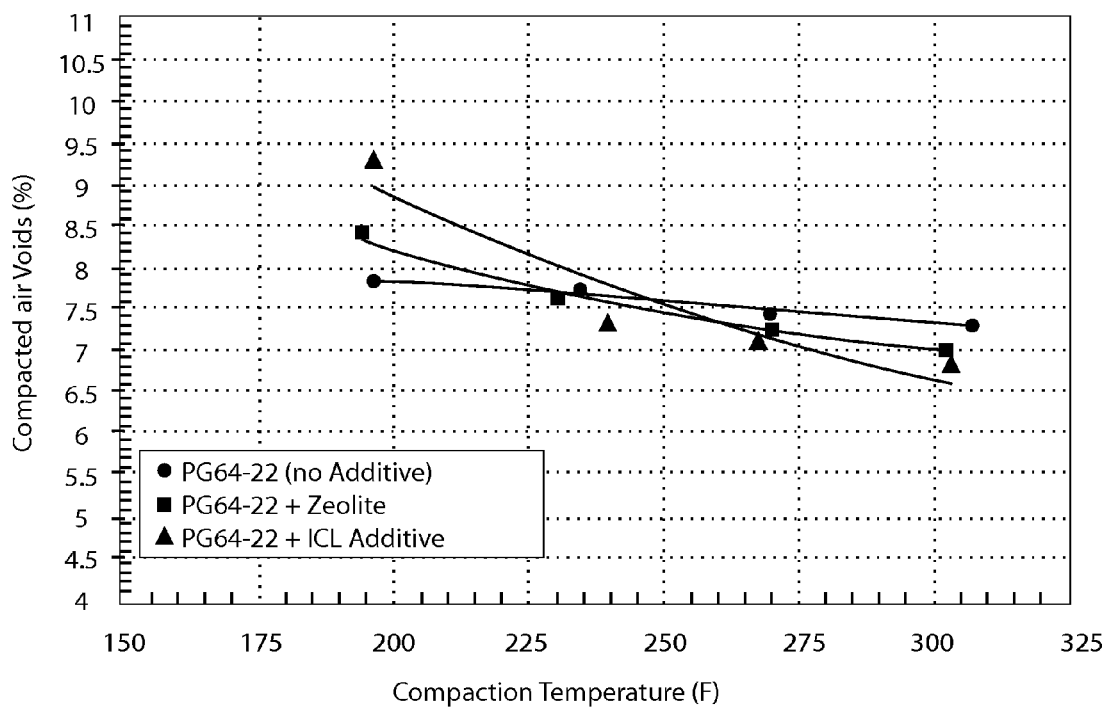
Figure 4:
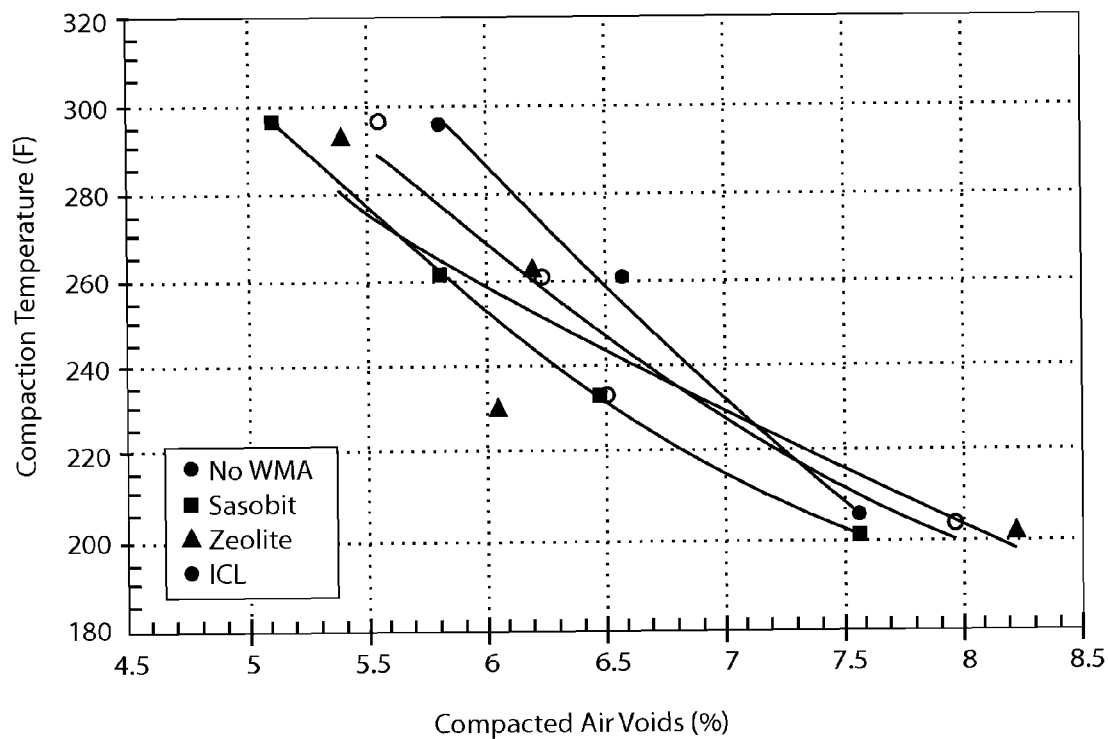
Figure 5:
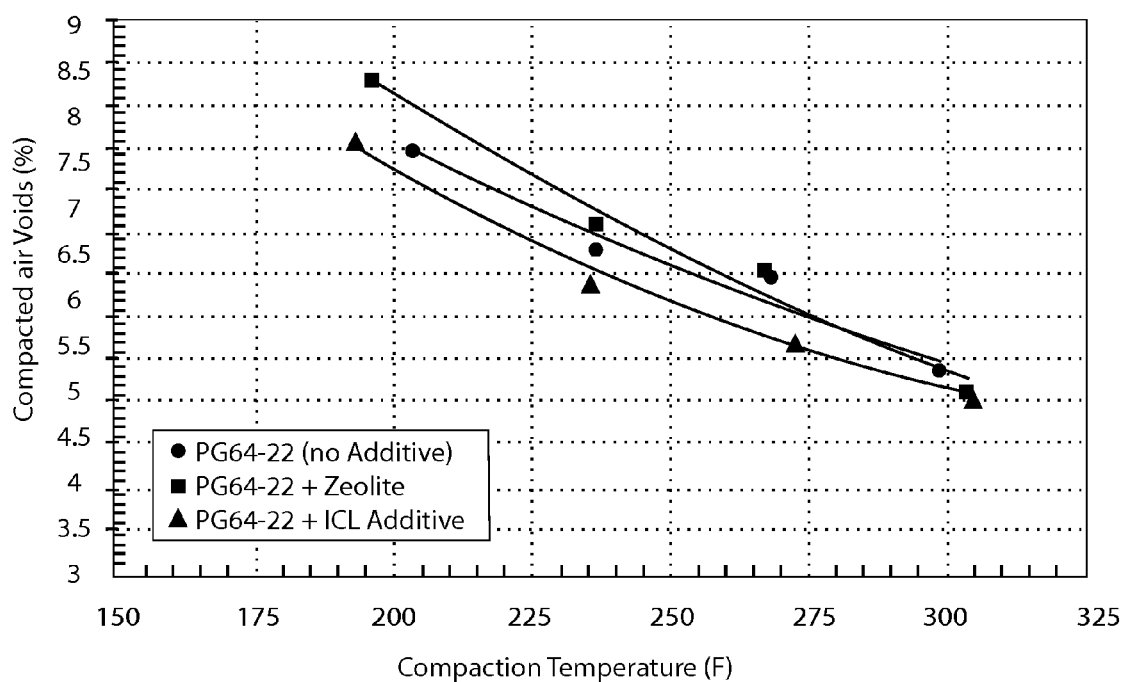

The results shown in FIGS. 2-5 illustrate the degree of compaction achieved by asphalt mixes with different warm mix additives and different aggregates in a Marshall Compaction test at different compaction temperatures. A total of 6 samples per mix and temperature combination were used to determine a "trimmed mean" average for comparisons. The foregoing results indicate that each of the warm mix additives evaluated provide an increase in mixture workability, thus reducing the air void constant at the different temperatures when compared to the control mix which did not contain a warm mix additive. An air void level of 6% is typical for most pavements. The statistical curves allow one to identify the compaction temperature at which the desired compaction is achieved. Referring to FIG. 5, for example, to achieve 6% compacted air voids, the asphalt mixes made (i) without warm mix additive, (ii) with Sasobit, with (iii) Zeolite, and (iv) with STPP hexahydrate required compaction temperatures of at least about 142° C., 123° C., 127° C., and 131° C., respectively. The foregoing data indicates that the control mix with no warm mix additives requires a compaction temperature of 287° F. to achieve 6% air voids. The addition of each modifier additive to the asphalt composition resulted in lower temperatures required to achieve 6% air voids. The addition of either Sasobit or zeolite lowered the compaction temperature to 253° F. and 260° F., respectively. Thus, the addition of the sodium tripolyphosphate hexahydrate increased the workability compared to the control mix.

Additionally, the results depicted in FIGS. 2-5 show that the performances of additives, including the sodium tripolyphosphate hexahydrate, depend, at least in part, on the gradation of the aggregates and the temperature of the mix during compaction. In general, when using an additive, the compaction tended to increase with coarseness of the aggregate. Additionally, the degree of compaction tended to increase with temperature.

Example 3

Evaluation of Permanent Deformation in Asphalt Comprising Modifier Additives

A disadvantage of using the Marshall compactor is that minimal performance testing can be conducted on the specimens. Although Marshall Stability and Flow are typically conducted, these parameters have been found to correlate poorly to high temperature permanent deformation, or "rutting", and low temperature cracking, or "fatigue". The Asphalt Pavement Analyzer Test, or AASHTO TP63A, "Standard Method of Test for Determining Rutting Susceptibility of Asphalt Paving Mixtures Using the Asphalt Pavement Analyzer (APA)" is a procedure for testing the rutting susceptibility of asphalt-aggregate mixtures using the Asphalt Pavement Analyzer (APA), a second-generation loaded wheel tester. In the test, The APA device simulates the field rutting phenomena by loading a pressurized hose that lays on-top of compacted HMA samples with a moving wheel load. The device has the capability of testing compacted brick or pill samples under various environmental conditions in both rutting and fatigue and can be linked to a computer and data acquisition system so the user can measure the rutting of the asphalt for each load cycle. The major benefit of using the device is as a comparative tool for mixture selection (i.e., to select the mix that ruts the least based on APA testing). The results of the Asphalt Pavement Analyzer Test were used to predict long-term susceptibility to rutting and to evaluate the effect of hydrated phosphate modifiers and methods on asphalt paving compositions.

For these studies, the asphalt mixture type used was a 12.5 mm Superpave mix, a common surface course mix used in the United States. The aggregate source used for the asphalt mix was a granite/gneiss source, which is also common used. The asphalt binder used to make the samples was PG64-22 (CITGO Asphalt, Paulsboro, N.J.). Asphalt mix samples were prepared with (i) no additive, (ii) Sasobit additive, (iii) Aspha-Min additive, and (iv) sodium tripolyphosphate hexahydrate additive. Sasobit (Sasol Wax), was added at a percentage of 3% by the total weight of the asphalt concrete mix. Aspha-Min (Eurovia), was added at a percentage of 0.3% by the total weight of the asphalt concrete mix. Sodium polyphosphate hydrate (ICL) was added at a percentage of 0.4% by total weight of the asphalt concrete mix. Sasobit, zeolite, and sodium tripolyphosphate hexahydrate were added and mixed to a 12.5 mm Superpave mix based on manufacturer's recommendations. Specifically, the additives Aspha-Min and sodium tripolyphosphate hexahydrate were added to the aggregate just prior to the addition of the asphalt binder to simulate the typical application area at a hot mix facility (either through the RAP collar system or pneumatically fed using a specially built feeder system—similar to the addition of fibers).

The rutting evaluation was carried out using the Asphalt Pavement Analyzer (APA) with a moving wheel load applied at a rate of about one cycle per second to a ¾ inch pressurized hose that rested atop the asphalt samples to simulate (on a small scale) the traffic loading that occurs in the field. All test specimens were compacted to 6% air voids (±0.2% compacted air voids). Prior to compaction, the test specimens were short term oven aged at an oven temperature that represents the compaction temperature at which 6% air voids occurs. These conditions would again simulate the target air void level a contractor strives to achieve during field placement, but at temperatures allowed by each warm mix additive. The APA test was run at a test temperature of 64° C. The samples were conditioned under this temperature for a minimum of 4 hours prior to testing. The rutting evaluation was carried out using the APA with a moving wheel load applied at a rate of about one cycle per second to a ¾ inch pressurized hose that rested atop the asphalt samples to simulate (on a small scale) the traffic loading that occurs in the field. Typical loading configurations were used, including a wheel load of 100 lbs and a hose pressure of 100 psi. Once conditioned, the samples were subjected to a 25 cycle seating load. Once the 25 cycles had been completed, the initial rut depths were measured. Testing then continued until 20,000 loading cycles were completed. The difference between the initial and final rut depth measurements was calculated as the APA rut depth.

Figure 6:
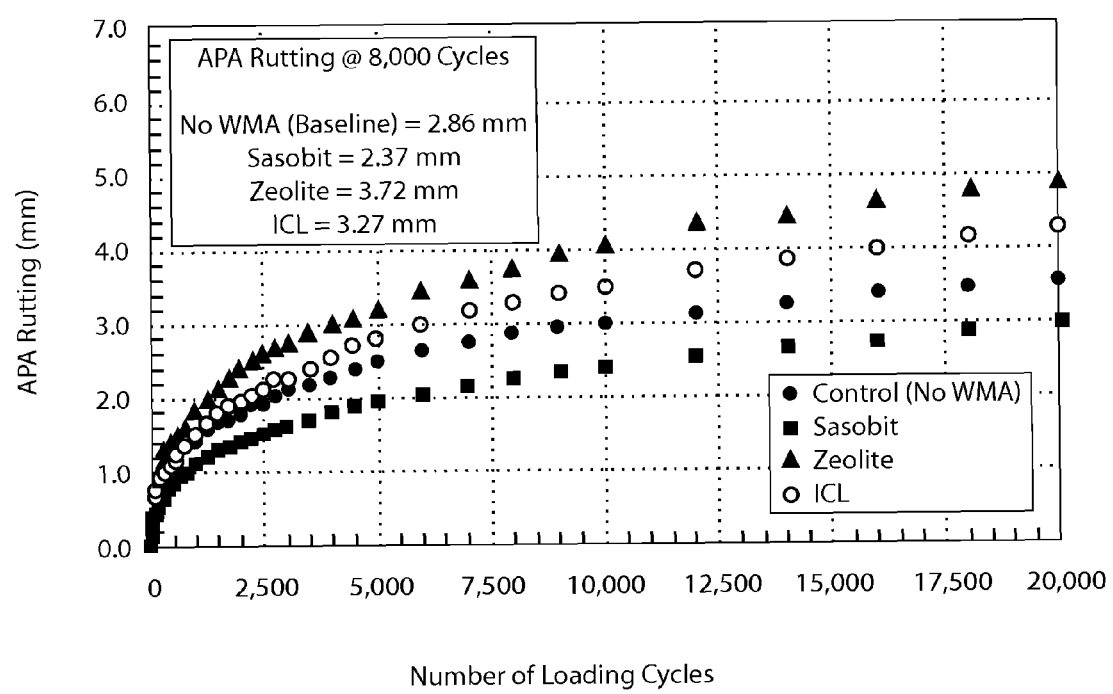
FIG. 6 illustrates the amount of rutting in warm mix asphalts in the Asphalt Pavement Analyzer test (AASHTO TP63A). In particular.
Figure 7:
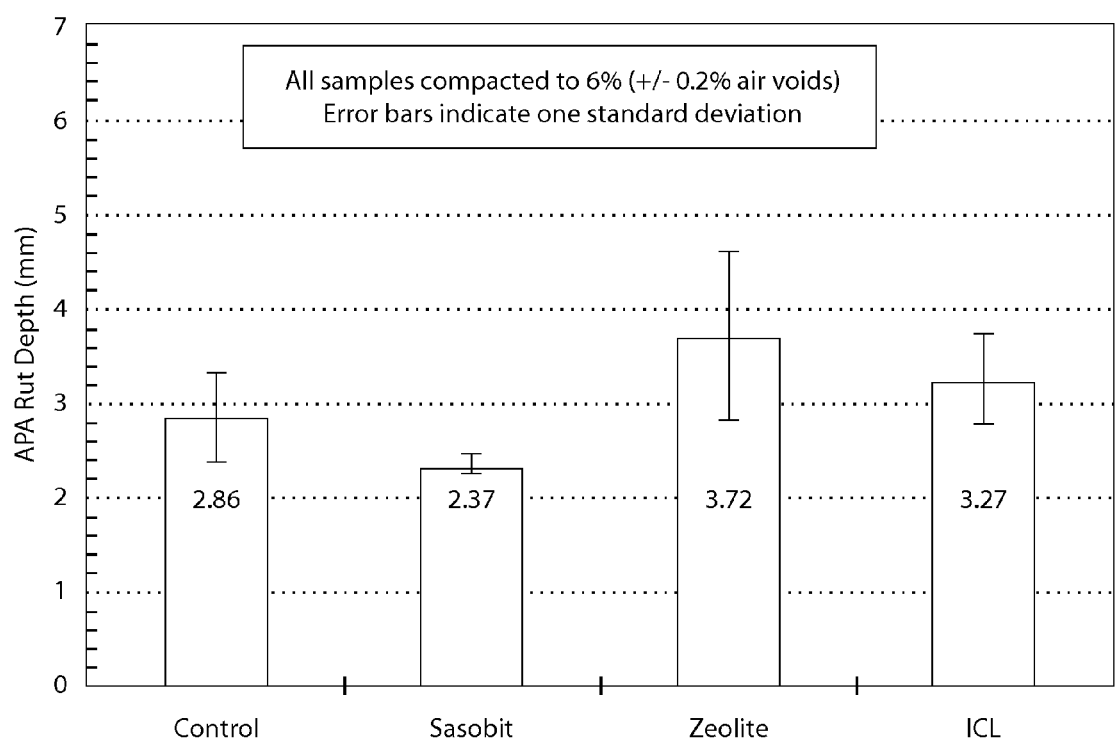
FIG. 7 illustrates the amount of rutting in warm mix asphalts in the Asphalt Pavement Analyzer test (AASHTO TP63A). In particular.

FIGS. 3 and 4 show the results of the APA test. FIG. 6 shows the amount of rutting (mm) as a function of loading cycles. FIG. 7 is a comparison of average rut depths of various warm mix asphalt modifiers to non-modified asphalt. The error bars in FIG. 6 indicate one standard deviation. The results indicate that on average the Sasobit samples achieved the lowest rut depths, while the zeolite samples accumulated the largest APA rut depths. Sodium tripolyphosphate was found to have slightly higher rut depths than the control mix, but still less than those for the zeolite mix.

A statistical analysis was conducted using a Student's t-Test analysis (two samples assuming equal or unequal variances) to compare the derived parameters of the two mixes. Prior to using the t-Test, the F-Test was used to determine if the variances were equal or unequal. The results of the F-Test were used to select the appropriate condition of the t-Test (equal or unequal variances). The analysis was used to determine if the rut depth results were statistically equal or statistically not equal among the common test results and parameters. A 95% confidence interval was chosen for the analysis. The results of the statistical comparison showed that at a 95% confidence level, the amount of rutting for all asphalt mixes tested were statistically equal.

Example 4

Evaluation of Fatigue Resistance in Asphalt Comprising Modifier Additives

The Flexural Beam Fatigue Test is used to determine the fatigue life and fatigue energy of compacted asphalt samples with dimensions of 50 mm thick by 63 mm wide by 380 mm in length. The system is designed to conduct the test known according to the AASHTO designation T321, entitled "Standard Test Method for Determining the Fatigue Life of Compacted Hot-Mix Asphalt (HMA) Subjected to Repeated Flexural Bending." However, the system is designed also to provide a wide range of loading types (haversine and sinusoidal) for both stress and strain controlled modes. The device is also enclosed in an environmental chamber to provide a wide range of potential temperature applications (−10° C. to 60° C.).

To date, there is no literature concerning the flexural fatigue resistance of warm mix asphalt. However, based on the typical characteristics that control fatigue resistance, warm mix asphalt would tend to have higher fatigue lives because the material can be produced (mixed and compacted) at lower temperatures, thereby not prematurely aging and stiffening the asphalt binder.

Figure 8:
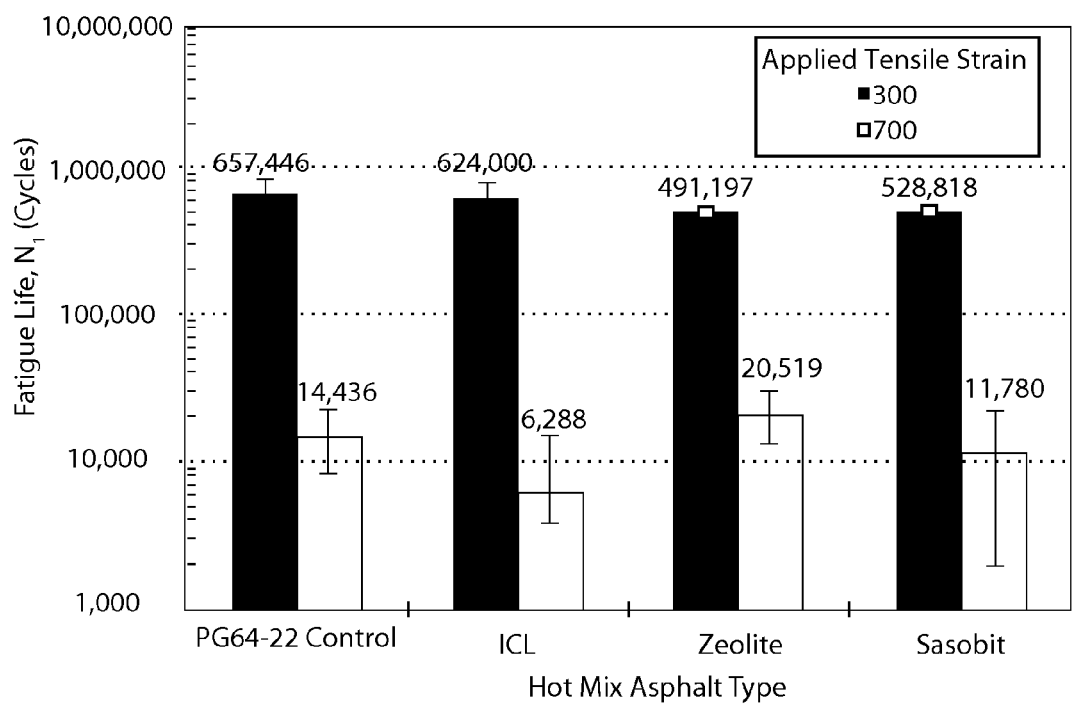
FIG. 8 illustrates the amount of fatigue in warm mix asphalts in the Flexural Beam Fatigue test (AASHTO T321).

A number of samples were tested over a wide range of applied strains or stresses to determine the asphalt mixes overall fatigue characteristics. For the samples, the asphalt mixtures were the same as those described above. The samples were compacted with the lab's vibratory compactor which had been modified to compact the specified sample size. Once compacted, the samples were trimmed to an approximate dimension of 65 mm (W)×50 mm (H)×380 mm (L). For comparison purposes, a minimum of 2 different magnitudes of tensile strains (300 and 700 micro-strains) were used. Also, for statistical reasons, a minimum of 2 samples per strain level were tested. The results are set forth in Table B and FIG. 8

TABLE B

| Sample Type | Tensile Strain (□-strain) | Fatigue Life, $N_f$ (Cycles) | Initial Modulus (MPa) | Air Voids (%) |
|---|---|---|---|---|
| PG64-22 Control | 300 | 553,191 | 9,000 | 6.13 |
| | | 761,701 | 7,894 | 6.32 |
| | | 657,446 | 8,447 | 6.23 |
| | 700 | 6,571 | 8,983 | 6.02 |
| | | 17,531 | 8,096 | 5.12 |
| | | 19,207 | 6,952 | 6.48 |
| | | 14,436 | 8,010 | 5.87 |
| Warm Mix Additive ICL | 300 | 519,576 | 8,966 | 6.04 |
| | | 728,424 | 9,584 | 5.78 |
| | | 624,000 | 9,275 | 5.91 |
| | 700 | 3,637 | 9,243 | 6.16 |
| | | 8,939 | 8,124 | 6.09 |
| | | 6,288 | 8,684 | 6.13 |
| Warm Mix Additive Zeolite | 300 | 502,773 | 7,606 | 6.11 |
| | | 479,621 | 7,206 | 6.05 |
| | | 491,197 | 7,406 | 6.08 |
| | 700 | 26,063 | 7,303 | 6.06 |
| | | 14,975 | 5,764 | 6.17 |
| | | 20,519 | 6,534 | 6.12 |
| Warm Mix Additive Sasobit | 300 | 542,666 | 7,271 | 6.50 |
| | | 514,969 | 7,714 | 6.43 |
| | | 528,818 | 7,492 | 6.47 |
| | 700 | 18,709 | 6,342 | 6.60 |
| | | 4,851 | 7,383 | 5.20 |
| | | 11,780 | 6,862 | 5.90 |

The test results show that at the lower tensile strain, the control mix (with no warm mix additive) and the ICL additive (sodium tripolyphosphate hexahydrate) had longer fatigue lives than the Sasobit- and Zeolite-added mixes. At the higher tensile strain level, the Zeolite-added mix had that longest fatigue life and the ICL-added mix had the shortest fatigue life. Importantly, the 300 tensile strain level is a much more practical measurement than the 700 tensile strain level so it is believed that the decrease in fatigue life for the ICL-added mix at the 700 level is inconsequential.

Example 5

Additional Compaction Properties of Asphalt Comprising Modifier Additives

Figure 9:
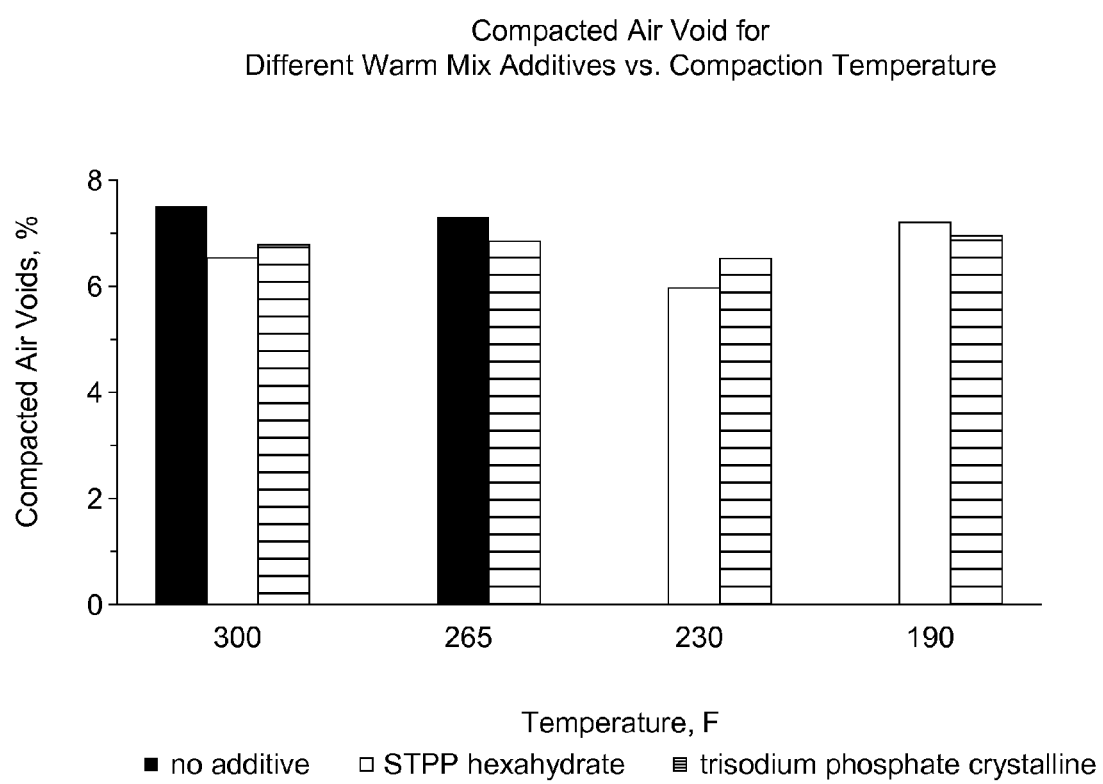
FIG. 9 illustrates the degree of compaction achieved for asphalt mixes having different warm mix additives when subjected to a vibratory compaction test.

Specimens were compacted to evaluate further the densification of warm mix without and with additives. The mix was prepared using a PG67-22 binder and a 12.5 mm granite Superpave design. Cylindrical specimens 150 mm in diameter were compacted using a vibratory compactor. The compaction pressure was 120 psi. The warm mix without hydrated phosphate additives at 300° F. (149° C.) achieved the desired 7±1% air voids after 30 seconds. The same compaction conditions were also used for the mixes with sodium tripolyphosphate hydrate at 0.3 wt % of the mix and with trisodium phosphate crystalline (ICL Performance Products LP) at 0.11 wt % of the mix. For both of these mixes with hydrated phosphate additives, the desired compaction was achieved at temperatures as low as 190° F. (88° C.), as shown in FIG. 9.

All references cited in this specification, including without limitation all journal articles, brochures, manuals, periodicals, texts, manuscripts, website publications, and any and all other publications, are hereby incorporated by reference. The discussion of the references herein is intended merely to summarize the assertions made by their authors and no admission is made that any reference constitutes prior art. Applicants reserve the right to challenge the accuracy and pertinence of the cited references.

It is to be understood that the above description is intended to be illustrative and not restrictive. Many embodiments will be apparent to those of skill in the art upon reading the above description. The scope of the invention should therefore be determined not with reference to the above description alone, but should be determined with reference to the claims and the full scope of equivalents to which such claims are entitled.

When introducing elements of the present invention or an embodiment thereof, the articles "a", "an", "the" and "said" are intended to mean that there are one or more of the elements. The terms "comprising", "including" and "having" are intended to be inclusive and mean that there may be additional elements other than the listed elements. Additionally, it is to be understood an embodiment that "consists essentially of" or "consists of" specified constituents may also contain reaction products of said constituents.

The recitation of numerical ranges by endpoints includes all numbers subsumed within that range. For example, a range described as being between 1 and 5 includes 1, 1.6, 2, 2.8, 3, 3.2, 4, 4.75, and 5.

What is claimed is:

1. An asphalt paving composition comprising an asphalt binder and aggregate, wherein the asphalt binder comprises asphalt and a hydrated phosphate modifier.

2. The asphalt paving composition of claim 1 wherein the asphalt binder is at a concentration that is between about 3% and about 8% by weight of the asphalt paving composition and the aggregate is at a concentration that is greater than about 90% by volume of the asphalt paving composition.

3. The asphalt paving composition of claim 1 wherein the aggregate has a Superpave gradation of at least 9.5 mm.

4. The asphalt paving composition of claim 1 wherein the concentration of the hydrated phosphate modifier is such that its water of hydration is at a concentration that is at least about 0.01% and no greater than about 6.0% by weight of the asphalt binder.

5. The asphalt paving composition of claim 1 wherein the concentration of the hydrated phosphate modifier is such that its water of hydration is at a concentration that is at least about 0.05% and no greater than about 2.0% by weight of the asphalt binder.

6. The asphalt paving composition of claim 1 wherein the hydrated phosphate modifier is selected from the group consisting of sodium tripolyphosphate hexahydrate, dimagnesium phosphate trihydrate, disodium phosphate dihydrate, trisodium phosphate crystalline, monocalcium phosphate monohydrate, tetrasodium pyrophosphate dodecahydrate, and dicalcium phosphate dihydrate, and combinations thereof.

7. The asphalt paving composition of claim 4 wherein the hydrated phosphate modifier is sodium tripolyphosphate hexahydrate or trisodium phosphate crystalline.

8. The asphalt paving composition of claim 7 wherein the sodium tripolyphosphate hexahydrate is at a concentration of at least about 0.20% and no greater than about 1.00% by weight of the asphalt paving composition and the trisodium phosphate crystalline is at a concentration of at least about 0.020% and no greater than about 1.00% by weight of the asphalt paving composition.

9. The asphalt paving composition of claim 8 wherein the concentration of the sodium tripolyphosphate hexahydrate is about 0.40% by weight of the asphalt paving composition and the concentration of the trisodium phosphate crystalline is about 0.11% by weight of the asphalt paving composition.

10. A modified asphalt binder comprising asphalt and a hydrated phosphate modifier.

11. The modified asphalt binder of claim 10 wherein the hydrated phosphate modifier is at a concentration such that its water of hydration is at a concentration that is at least about 0.01% and no greater than about 6.0% by weight of the asphalt binder.

12. The modified asphalt binder of claim 10 wherein the hydrated phosphate modifier is selected from the group consisting of sodium tripolyphosphate hexahydrate, dimagnesium phosphate trihydrate, disodium phosphate dihydrate, trisodium phosphate crystalline, monocalcium phosphate monohydrate, tetrasodium pyrophosphate dodecahydrate, and dicalcium phosphate dihydrate, and combinations thereof.

13. The modified asphalt binder of claim 10 wherein the hydrated phosphate modifier is sodium tripolyphosphate hexahydrate or trisodium phosphate crystalline.

14. The modified asphalt binder of claim 13 wherein the sodium tripolyphosphate hexahydrate is at a concentration of at least about 0.25% and no greater than about 2.0% by weight of the asphalt binder and the trisodium phosphate crystalline is at a concentration of at least about 0.25% and no greater than about 1.50% by weight of the asphalt binder.

15. A method for reducing the temperature range in which an asphalt paving composition is subjected to a particular compressive force to achieve a particular degree of compaction, the method comprising modifying the asphalt paving composition by adding a hydrated phosphate modifier.

16. A method for preparing an asphalt paving composition, the method comprising the steps of mixing an asphalt binder, an aggregate, and a hydrated phosphate modifier to produce the asphalt paving composition.

17. The method of claim 16 wherein the hydrated phosphate modifier is mixed with aggregate to form a modified aggregate comprising the aggregate and the hydrated phosphate modifier and the asphalt binder is mixed with the modified aggregate thereby producing the asphalt paving composition.

18. The method of claim 16 wherein the asphalt binder is mixed with the aggregate to form an asphalt-aggregate mixture and the hydrated phosphate modifier is mixed with the asphalt-aggregate mixture thereby producing the asphalt paving composition.

19. The method of claim 17 wherein the asphalt binder is heated to a temperature that is at least about 190° F. (about 88° C.) and not greater than about 300° F. (about 150° C.) before it is mixed with the aggregate, which is at temperature at least about 240° F. (about 115° C.) just before being mixed with the asphalt binder.

20. The method of claim 17 wherein the asphalt binder is heated to a temperature that is at least about 220° F. (about 104° C.) and not greater than about 280° F. (about 138° C.) before it is mixed with the aggregate, which is at a temperature at least about 240° F. (about 115° C.) just before being mixed with the asphalt binder.

21. The method of claim 19 wherein the asphalt binder is at a concentration that is between about 3% and about 8% by weight of the asphalt paving composition, the aggregate is at a concentration that is greater than about 90% by volume of the asphalt paving composition, and the hydrated phosphate modifier is at a concentration such that that its water of hydration is at a concentration that is at least about 0.01% and no greater than about 6.0% by weight of the asphalt binder.

22. The method of claim 21 wherein the hydrated phosphate modifier is selected from the group consisting of sodium tripolyphosphate hexahydrate, dimagnesium phosphate trihydrate, disodium phosphate dihydrate, trisodium phosphate crystalline, monocalcium phosphate monohydrate, tetrasodium pyrophosphate dodecahydrate, and dicalcium phosphate dihydrate, and combinations thereof.

23. The method of claim 21 wherein the hydrated phosphate modifier is sodium tripolyphosphate hexahydrate or trisodium phosphate crystalline.

24. The method of claim 23 wherein the sodium tripolyphosphate hexahydrate is at a concentration of at least about 0.20% and no greater than about 1.00% by weight of the asphalt paving composition and the trisodium phosphate crystalline is at a concentration of at least about 0.02% and no greater than about 1.00% by weight of the asphalt paving composition.

25. The method of claim 21 wherein the aggregate has a Superpave gradation of at least 9.5 mm.

* * * * *